United States Patent [19]
Berling

[11] Patent Number: 5,921,082
[45] Date of Patent: Jul. 13, 1999

[54] MAGNETICALLY POWERED HYDRO-BUOYANT ELECTRIC POWER GENERATING PLANT

[76] Inventor: James T. Berling, 5434 E. Galbraith Rd., Cincinnati, Ohio 45236

[21] Appl. No.: 08/697,375

[22] Filed: Aug. 23, 1996

Related U.S. Application Data

[60] Provisional application No. 60/024,199, Aug. 23, 1995.
[51] Int. Cl.$^6$ .............................. F16D 31/02; F03B 13/10
[52] U.S. Cl. ................................ 60/325; 60/398; 60/495; 60/496; 417/331; 290/42; 290/53
[58] Field of Search .............................. 60/398, 328, 495, 60/496; 417/330, 331, 332, 415; 290/42, 53

[56] References Cited

U.S. PATENT DOCUMENTS

| | | | |
|---|---|---|---|
| 4,563,591 | 1/1986 | Jones | 290/42 X |
| 4,684,815 | 8/1987 | Gargos | 290/53 |
| 4,931,662 | 6/1990 | Burton | 290/42 |
| 5,426,332 | 6/1995 | Ullman et al. | 290/42 X |
| 5,440,176 | 8/1995 | Haining | 290/42 X |

*Primary Examiner*—Hoang Nguyen
*Attorney, Agent, or Firm*—Frederick H. Gribbell; James P. Davidson

[57] ABSTRACT

A hydro-buoyant electrical power generating plant is provided which generates electricity from a source of hydraulic pressure. The energy that pressurizes the hydraulic fluid is derived from movements of a crane-like class II lever that has its fulcrum fixed to a stationary land mass so that the fulcrum's position is fixed relative to the lever's opposite "movable" end where the applied load is established. The movable end of the lever is attached to an "applied force vessel" that alternatively can be filled with water (or other liquid) so as to sink due to gravity, and then can be evacuated of water so as to rise due to buoyancy. When the applied force vessel is at its position of greatest elevation, the interior chamber of the vessel initially would be filled with air, typically at atmospheric pressure. Valves mounted to the bottom and top of the vessel are then opened to allow liquid to enter the vessel from beneath the vessel, thereby allowing the vessel (and its attached lever) to sink to its point of least elevation. At its uppermost position, the vessel of the preferred embodiment is floating, and thereby displacing its own weight. While the vessel is sinking, the mechanical motion of the attached lever creates power that will be used to drive linear hydraulic actuators (e.g., double acting single ended actuators), that in turn will be used to displace and pressurize a hydraulic fluid. This hydraulic fluid can then be taken directly to a hydraulic motor which can be used to drive an electrical generator, or the pressurized fluid can be stored indefinitely in hydraulic accumulators. Once the applied force vessel reaches its bottom-most position, the valves below and above the vessel are closed, and multiple submersible pumps attached around the vessel's bottom surface periphery begin to pump the liquid that is presently contained within the vessel out to the surrounding medium (i.e., the infinite liquid). As the liquid is pumped out of the vessel, the vessel becomes buoyant, and a buoyancy stroke can now be started and the entire lever and vessel structure begins to rise in the vertical direction. While the vessel is rising, the mechanical motion of the attached lever creates power that again will be used to drive the double acting linear hydraulic actuators.

22 Claims, 7 Drawing Sheets

MAGNETICALLY POWERED HYDRO-BUOYANT ELECTRIC POWER GENERATING PLANT

This application if a continuation of provisional application No. 60/024,199, filed on Aug. 23, 1995, now abandoned.

TECHNICAL FIELD

The present invention relates generally to a decentralized power plant in which its major power source is the buoyancy of water or other liquid. The invention is particularly directed to a power station that uses a crane-like class II type lever that has a fulcrum fixed to a stationary land mass so that its position is fixed relative to the opposite end where the applied load is established. The lever is constructed so as to provide a neutral buoyancy condition to the lever itself when it is submerged in the liquid.

BACKGROUND OF THE INVENTION

Decentralized electrical power plants will become quite common in the near future. Such stations have many advantages over the present designs for electrical utility power plants, which are typically quite large and often located a large distance from the load for which they are providing power. Another use for decentralized electrical power plants will be as installations placed along highways as recharging stations for battery powered vehicles, which have a limited range as compared to gasoline powered vehicles and which require special electrical recharging stations that are not available at typical gasoline stations.

The disadvantage of decentralized electrical power plants is that each one requires an energy producing device, such as a coal-fired or oil-fired boiler, or a solar panel array, or some type of hydro-electric power. From a cost standpoint, it typically has been much more efficient to build very large power plants, especially when the power source is nuclear. In addition, every power plant must meet certain environmental regulations, and many persons consider it undesirable to place coal-fired or oil-fired power plants in many locations. Another disadvantage of the present technology is that smaller power plants are less efficient than larger (or very large, such as 1200 MVA) power plants.

SUMMARY OF THE INVENTION

Accordingly, it is a primary object of the present invention to provide a hydro-buoyant electrical power generating plant that can be constructed as a decentralized electrical power station, and will produce essentially zero pollution.

It is another object of the present invention to provide a hydro-buoyant electrical power generating plant that can produce large amounts of electrical power on very short notice.

It is a further object of the present invention to provide a hydro-buoyant electrical power generating plant in which the primary energy source is the buoyancy of the liquid acting upon a power piston which generally comprises a crane-like class II lever with an applied force vessel attached to the movable end of the lever.

It is yet another object of the present invention to provide a hydro-buoyant electrical power generating plant in which potential energy can be stored for long periods of time.

It is yet a further object of the present invention to provide a hydro-buoyant electrical power generation plant that can be used to dynamically recharge batteries of electrically-powered vehicles, including a system that allows the vehicle to remain in motion during the charging procedure.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, a hydro-buoyant electrical power generating plant is provided which generates electricity from a source of hydraulic pressure. The energy that pressurizes the hydraulic fluid is derived from movements of a crane-like class II lever that has its fulcrum fixed to a stationary land mass so that the fulcrum's position is fixed relative to the lever's opposite "movable" end where the applied load is established. The movable end of the lever is attached to an "applied force vessel" that alternatively can be filled with water (or other liquid) so as to sink due to gravity, and then can be evacuated of water so as to rise due to buoyancy.

The hydro-buoyant power generating plant operates on two power strokes, a lower-power sinking stroke, and a higher-power buoyancy stroke. Starting, for example, with the applied force vessel at its position of greatest elevation, the interior chamber of the vessel initially would be filled with air, typically at atmospheric pressure. Valves mounted to the bottom and top of the vessel would then be opened to allow liquid to enter the vessel from beneath the vessel, thereby allowing the vessel (and its attached lever) to sink to its point of least elevation. At its uppermost position, the vessel of the preferred embodiment is floating, and thereby displacing its own weight. While the vessel is sinking, the mechanical motion of the attached lever creates power that will be used to drive linear hydraulic actuators (e.g., double acting single ended actuators), that in turn will be used to displace and pressurize a hydraulic fluid. This hydraulic fluid can then be taken directly to a hydraulic motor which can be used to drive an electrical generator, or the pressurized fluid can be stored indefinitely in hydraulic accumulators. During the sinking stroke, it is preferred that the "infinte" liquid within which the vessel is emersed (e.g., water or oil) be allowed to flow upward through the vessel as quickly as possible, thereby allowing the vessel to sink as quickly as possible. Consequently, it is preferred to have multiple numbers of these valves that are attached to the upper and lower surfaces of the vessel so as to have the maximum amount of valve open area through which the liquid can flow very quickly.

Once the applied force vessel reaches its bottom-most position, the valves below and above the vessel are closed, and the linear actuators of the preferred embodiment are at their state of greatest extension. The vessel preferably has multiple submersible pumps attached around the vessel's bottom surface periphery which are designed to pump the liquid that is presently contained within the vessel out of the vessel and into the surrounding medium (i.e., the infinite liquid). As the liquid is displaced out of the vessel, air at atmospheric pressure is introduced into the top of the vessel via an air line that is mounted to the vessel, and which runs along the crane-like lever back to an intake that protrudes above the level of the liquid medium (i.e., is located within normal atmospheric air). As the liquid is pumped out of the vessel, the vessel becomes buoyant. The buoyancy stroke can now be started and the entire lever and vessel structure begins to rise in the vertical direction.

It is important to note that the entire crane-like lever structure is neutrally buoyant throughout all operational steps of the present invention, and therefore, its physical weight does not enter into the efficiencies of the operation of the electrical power plant. The linear actuator attached to the lever becomes the load, and the actuator is now being forced into its retracted position. Once again, hydraulic fluid becomes displaced at high pressure, thereby providing a high energy source to drive hydraulic motors or to be stored in hydraulic accumulators.

It is preferred that all of the liquid contained within the applied force vessel be evacuated by the submersible pumps before the vessel and lever are allowed to exhibit any upward motion. This is achieved by locking the position of the linear actuator, preferably by use of closed valves within the hydraulic system, thereby not allowing the linear actuator to move until the desired time. Once the vessel has been completely evacuated of its working liquid, the potential energy due to its buoyant force will be at its maximum value. At this time, the hydraulic valves for the linear actuator are opened, and the entire vessel and lever combination are allowed to rise within the infinite liquid medium. Due to the power of its buoyancy, this rising motion will occur quite quickly, thereby generating a large amount of power.

Once the applied force vessel reaches its uppermost position, one entire cycle of the power generating system will have been completed. The air line that allowed air pressure to fill the vessel includes a check valve, so that liquid, once it begins to re-enter the inner spaces of the vessel, does not go up the air line past this check valve. Once the vessel has arrived at its uppermost position, it can either be held in place at that position, or it can be immediately be placed into a downstroke condition by opening the valves that are located along its upper and lower surfaces, thereby beginning a new power stroke.

The amount of time required to pump all of the infinite liquid out of the interior spaces of the applied force vessel is dependent upon the number and the displacement capacity of the pumps. It should be noted that, when the vessel is fixed at its bottom-most position in the condition where all of the infinite liquid has been pumped out of its interior spaces, the vessel is at its maximum potential energy. In this state, it can be held in position as long as desirable until another maximum power stroke is desired by the electrical generating plant.

Using the method of the present invention, the valves located on the upper and lower surfaces of the applied force vessel are generally operated at a very low pressure differential. For example, when the vessel initially reaches its bottom-most position, these valves are closed so as to prevent further flow of the infinite liquid through the interior spaces of the vessel. At this moment, the valves are operating in an equilibrium state, and the pressure differential operating against these valves is essentially zero. On the other hand, after the vessel reaches its upper-most position, and it is desired to enter a new downstroke, these valves are then opened. It is preferred that the vessel be allowed to float on the surface of the infinite liquid medium, and therefore, the upper surface valves will be exposed to atmospheric pressure. Therefore, these upper surface valves will be working an equilibrium condition, since they will be exposed to atmospheric pressure both on their exterior and interior portions. At this time, the lower surface valves of the vessel will be working against a relatively small pressure differential, which will be equal to the depth of the valves within the infinite liquid medium at the time that the vessel is at its upper-most position, and is displacing its own weight.

In the illustrated embodiment of the present invention, each applied force vessel and crane-like lever with attached linear actuator can be described as comprising a single "unit." An array of units can be configured to make up a "station," which typically would contain a common hydraulic system that provides pressurized hydraulic fluid to a series of accumulators to store the potential energy of such pressurized hydraulic fluid. Several stations can be used to provide hydraulic power to an electrical generating "plant," which in the illustrated embodiment contains a common set of hydraulic motors and electrical generators. In addition, further high pressure hydraulic accumulators can be utilized in the plant to store even further energy produced by the various stations.

If the entire power capacity being produced by the units is required instantaneously, then the hydraulic fluid being displaced by the linear actuators of the units can be immediately transferred into the hydraulic motors of the electrical power generating plant. Under this circumstance, the accumulators positioned around the various stations and at other locations temporarily would not be receiving any access hydraulic fluid. However, under more normal operating conditions, there could be an excess of power generation capacity insofar as the amount of energy or power that can be produced by the cumulative units at the various stations compared to the amount of electrical energy currently required to be output (i.e., the "demand") from the electrical power plant. During such times, an excess of hydraulic power is available to be placed into the various accumulators for later use.

If the accumulators are all filled to their maximum capacity, then some of the units can be temporarily halted, preferably at their bottom-most positions with the applied forced vessels evacuated of liquid. In this condition, the power generating plant would be exhibiting its maximum potential energy, essentially just waiting for its next peak demand cycle for electrical energy usage. Under this condition, if a peak electrical demand cycle occurred, then all of the units could be placed into their buoyant upstrokes, thereby creating a very large amount of available power virtually instantaneously, and this power could be immediately transferred to the hydraulic motors and electrical generators of the power plant. Furthermore, if even more power is needed immediately after the upstrokes have occurred from all of the units, then the hydraulic energy stored in the accumulators can be transferred to the hydraulic motors to provide further electrical generation capacity on a more continuous basis.

The present invention not only uses the power-piston type of device (e.g., hydraulic actuators) to develop kinetic energy during movement of the lever-vessel assemblies of the units, but the same lever-vessel devices can be used to store the full amount of kinetic energy that it would normally produce during their upward power strokes. The lever-vessel assemblies of the units can be held in place at any position of their travel to store potential energy, particularly if the interior of the vessels remains full of gas rather than liquid. In this state, the buoyancy of the vessels will still be available to create power by simply being allowed to resume the upward movement of such vessels, regardless of their at rest elevations (so long, of course, that the vessels were not already at their uppermost positions). Additionally, this level of new potential energy is of a significant magnitude, and it can be stored indefinitely without the requirement of introducing additional energy storage devices to accomplish this capability.

The operating state where some or all of the lever-vessel assemblies have their upward motion halted would typically occur when all of the hydraulic accumulators have been fully pressurized, and the power plant is storing its maximum potential energy of hydraulic fluid. In this circumstance, one inherent feature of the design of the power plant of the present invention is observed—the power plant has two mechanisms for storing energy: (1) the entire force capacity of each vessel can be stored indefinitely at its peak level of potential energy (by being halted at its lowermost position while its interior is full of gas, not liquid), and (2) it can release a portion or all of this potential energy at any point in its upward power stroke. The storage capacity in the illustrated embodiment for one vessel is equivalent to eight-nine forty-gallon capacity accumulators, and further potential energy can be created by allowing the vessel to exercise its power stroke and further pressurize the hydraulic accumulators.

A further aspect of the present invention includes a dynamic method of transferring electrical energy to moving vehicles. As electrical vehicles need to be recharged, they can stop at a battery recharging facility and "plug in" to an electrical power source. Alternatively, by using the present invention, electrical energy can be transferred to moving vehicles by constructing a special roadway that contains embedded inductors, in which the inductors are electrically connected to the output of the electrical generators of the power plant of the present invention. As electrically-powered vehicles move along these inductors imbedded in the roadway, a pick-up device located in the electrically-powered vehicle can be used to receive electromagnetic energy produced by the inductors imbedded in the roadway, much like the operating principle of an electrical transformer. The power provided by the electrical generating plant become available as inductive lines of force produced by the inductors imbedded in the roadway and the moving vehicle's pick-ups will "cut" those lines of force, thereby obtaining electrical energy in the process.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
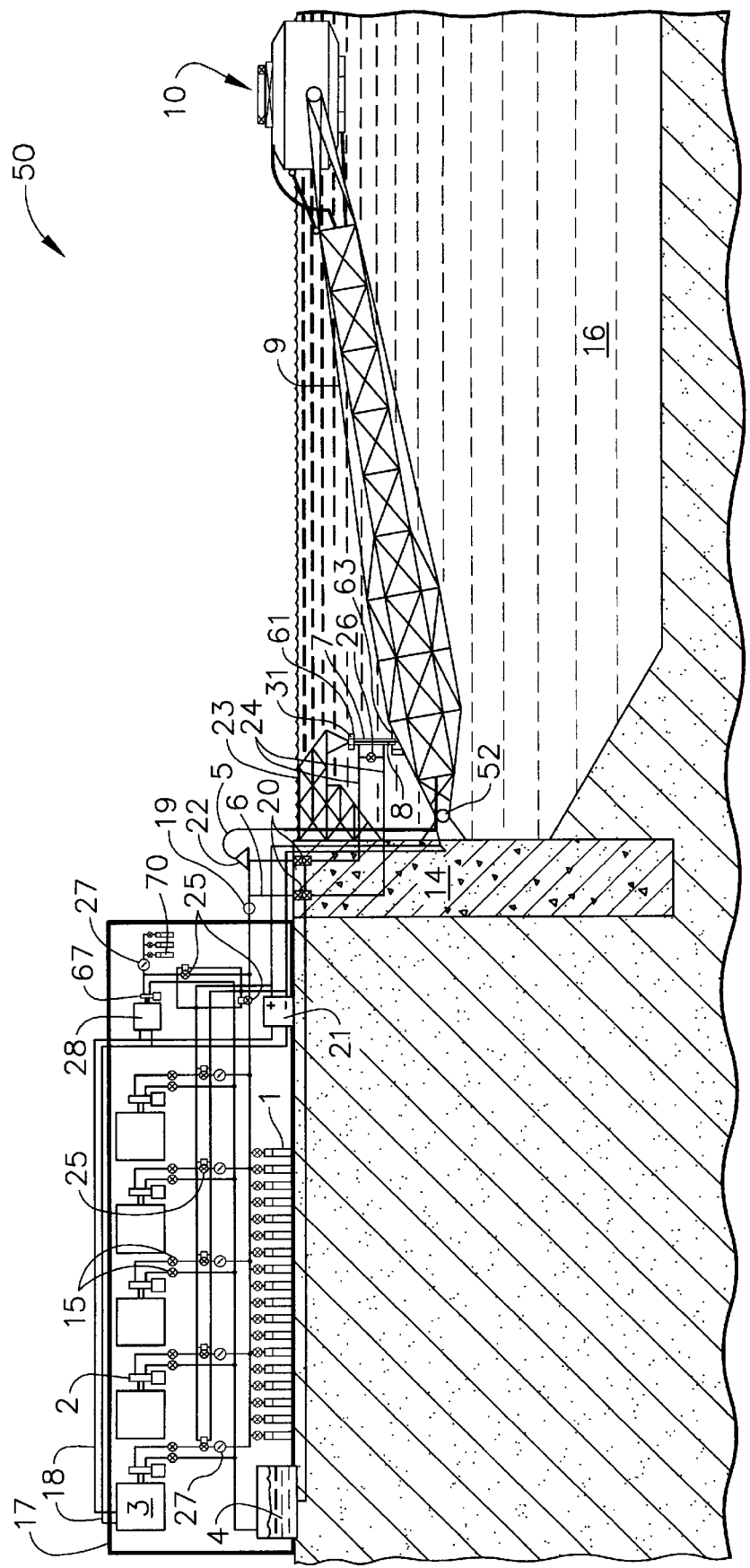
FIG. 1 is a diagrammatic view of a portion of an electrical generating power plant as constructed according to the principles of the present invention, along with an associated unit comprising a crane-like lever and applied force vessel, in which the applied force vessel is located at its upper-most movable position.

Referring now to the drawings, FIG. 1 shows a magnetically powered hydro-buoyant electric power generating plant, generally designated by the index numeral 50. The plant is of a modular design and can be constructed to provide electrical power from as little as a few watts to greater than a 1000 megawatts. The present invention combines the use of important forces in nature such as gravity, buoyancy and magnetism, to yield a high volume, low cost electrical energy source.

Inherent in the invention is the flexibility to easily vary many basic parameters of the design such as plant output capacity (size), plant location, variability of the magnitude and capacity of energy storage and selectability of the size and number of motor generators required at any given instant. Depending on the instantaneous electrical demand, the invention can supply energy for storage, or a portion of this stored energy can be used to drive one or more output motor generators, or the input energy can be reduced or increased automatically in order to satisfy the overall energy requirements of the plant. The invention yields virtually pollution free electric power and does not require an external energy input of any kind to maintain its rated output.

Figure 6:
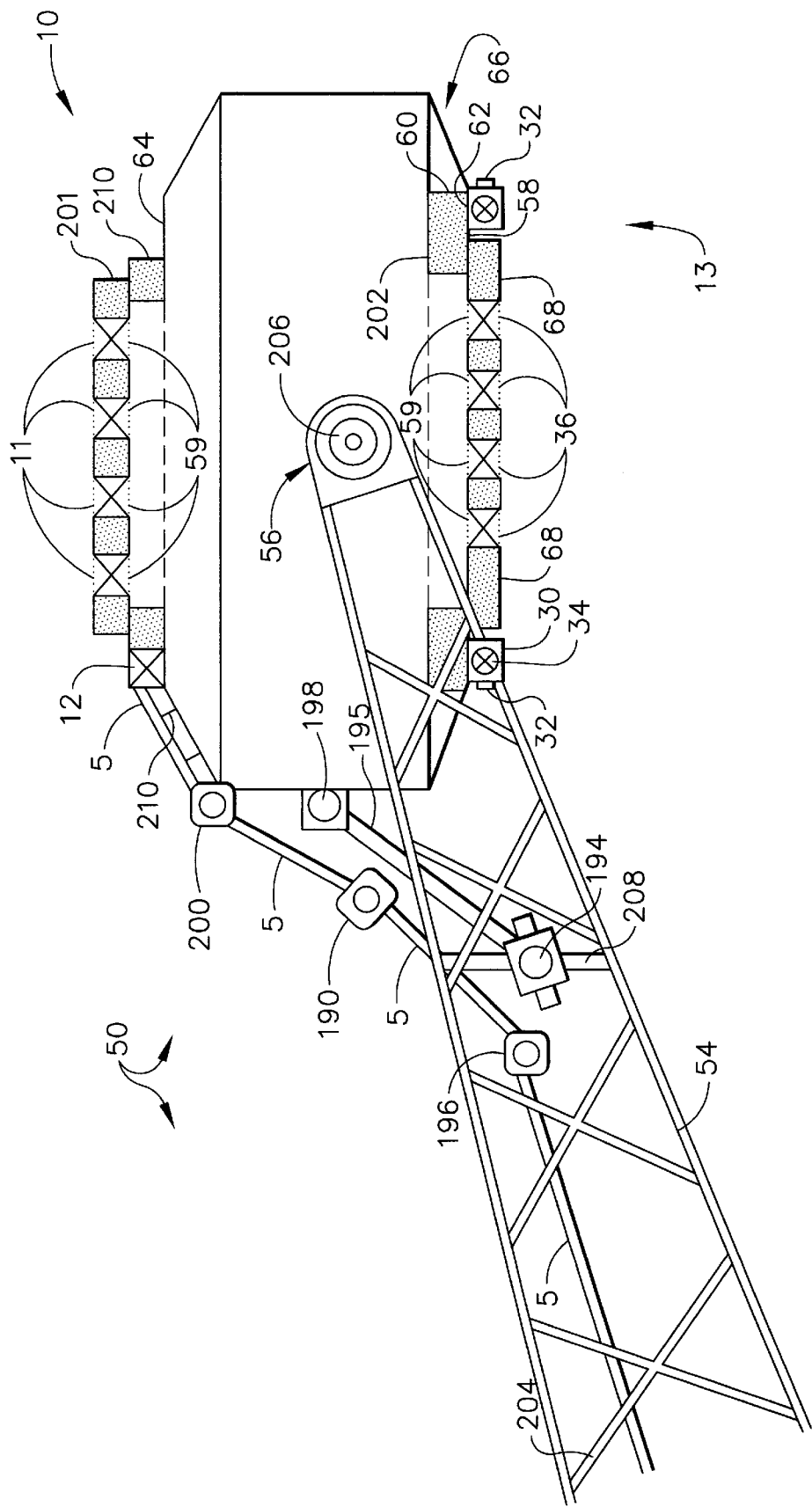
FIG. 6 is a diagrammatic view, in greater detail, of the applied force vessel of the electrical power plant and unit of FIG. 1.

The illustrated embodiment of FIGS. 1–5 depicts a power plant design that has the capacity for approximately 17 megawatts of electrical power. This level of capacity is approximately one tenth of the magnitude of major base load electrical power units, however, this size will be a useful for many decentralized power stations such as will be used along the nations highways as Dynamic Power Supply Stations (D.P.S.S.). An exemplary Dynamic Power Supply Station is shown in FIG. 6 for re-charging battery powered transportation devices such as trucks and automobiles. Additionally, power stations of this size will be positioned at various locations around a given city to satisfy consumers' electrical requirements, or power stations will be established in other areas of need that require electrical power.

Power plant 50 generally comprises a 200 foot long crane-like class II type lever, designated by the index numeral 9, that has its fulcrum preferably fixed to a stationary land mass, or to some other structure in a manner such that its position is fixed relative to the opposite end where the applied load is established. This lever 9 is constructed so as to provide a neutral buoyancy condition to the lever itself when it is submerged in a relatively large volume of fluid 16, preferably a liquid such as water, or oil. In the illustrated embodiment, the fulcrum point of the lever (at index numeral 52) is firmly attached to a fixed pin type clevis that has been fastened to a reinforced concrete dock wall 14, or a similar type of support wall system that, in the illustrated embodiment, is located forty feet beneath the surface of the liquid mass 16.

The distance of forty feet is an arbitrary distance and it is established by the length of the lever and the arc that is scribed by the lever 9 as referenced to the lever's fulcrum point 52 as it moves through a nearly vertical distance of plus and minus forty feet. Obviously, a class II lever that has a 200 foot lever length will yield an arc that contains a radius of curvature of 200 feet. Since the "applied force" is generated at the end of the lever that is opposite the fulcrum end of the lever, it is important that the force be applied to the lever 9 as close to a position of ninety degrees as possible over the working distance. Maintaining this condition should yield the maximum possible force capability over the entire distance traveled by lever 9.

The applied load end of lever 9 is designed preferably so as to provide a yoke and pin arrangement that spans a 50 foot diameter "thin wall" vessel 10 that has both ends closed. The size of vessel 10 is obviously a variable, but, in this illustrated embodiment, comprises a closed-ended vessel that is fifty feet in diameter and is 12.8 feet (153.6 inches) in height. Vessel 10 will be referred to hereinafter as an "Applied Force Vessel" (A.F.V.), and is constructed of an economical steel with approximately 0.25 inch wall thickness. Internal steel webbing and structural supports may be required for stability purposes, and for carrying the force being applied through the lever yoke 54 and the vessel's pin assembly 56.

Pin assembly 56 comprises several individual members. A pin and clevis assembly is located at the side wall of A.F.V. 10 at the index numeral 198. A levelling and stabilizing bar 195 is placed between pin and clevis assembly 198 and another pin and clevis assembly having a slotted slide 194. A support 208 is provided for the clevis/pin assembly 194. In addition, a double rotary union 190, is located in a region between the end points of the bar 195. More detail concerning the double rotary union 190 is given hereinbelow.

The lever 9 includes reinforcing members, such as member 204. Lever 9 terminates at a trunnion 206, which provides a pivot point for the A.F.V. 10, at its center of gravity. It is preferred that A.F.V. 10 be levelled automatically by use of the levelling and stabilizing bar 195, along with the other components located near yoke 54.

Vessel 10 essentially is a hollow container with the exception of its structural support. A series of one-inch diameter through-holes 58 are positioned at the base of vessel 10 (see FIG. 6) and are located within a large diameter twelve-inch high manifold 60 and flange 202 combination are positioned. The through-holes 58 around the bottom surface of manifold 60/flange 202 are fitted with 150 pound flanges to accommodate mating flanges that are attached to magnetically powered submersible pumps 30, located at the bottom portion 13 of vessel 10. The spacing for each set of holes is selected to conform to the spacing for the suction ports on the special magnetically powered, linear motion submersible piston pumps 30. A pump of this type preferably is attached directly to applied force vessel 10 (A.F.V.) at each set of adjacent holes 62 that are located uniformly around the bottom surface of the flange/manifold 60, located at the base of A.F.V. 10.

The top portion of the A.F.V. 10 preferably consists of a ¼ inch thick steel dome cover 64 which is welded directly to the top surface of the sides of the A.F.V. Groups of magnetically powered air/water shutoff valves 11 are positioned on the outside surface and at the peak region of the dome 64 in a large diameter eighteen-inch high upper manifold/flange, 201, which is located adjacent to valves 11.

A base or bottom cover for the A.F.V. 10 consists of a ¼ inch thick steel dome 66 that is welded directly to the bottom surface of the sides of applied load force vessel 10. Groups of specially designed magnetically operated shutoff valves 36 are positioned on the outside surface of a special manifold 68 that is attached directly to the A.F.V. bottom cover and in the peak region of the dome. These valves 36 and, in conjunction with valves 11, are used to flood A.F.V. 10 with the fluid 16 in which it is immersed and are used to allow the fluid to flow through A.F.V. 10 as it descends. Valves 11 and 36 are then closed as A.F.V. 10 reaches its maximum depth position (see FIG. 3).

The specially designed magnetically operated pumps 30 and magnetically operated valves 11 and 36 are preferably of a type described in co-pending commonly-owned U.S. patent applications, Ser. No. 08/299,069, titled MAGNETICALLY POWERED LINEAR DISPLACEMENT APPARATUS, filed on Aug. 31, 1994, and U.S. patent application Ser. No. 08/387,403, titled MAGNETICALLY-POWERED PUMP, VALVE, AND VEHICLE, filed on Feb. 10, 1995, and which are expressly incorporated by reference herein.

Positioned at the twenty-foot distance point from the fulcrum point 52 of lever 9 is a series of linear displacement hydraulic actuators 7. These single ended, double acting actuators 7 have their base end securely fastened to the stationary land mass 14 at a support 23 with a clevis and pin arrangement 31, as shown in FIG. 1. The rod end of each actuator 7 is fastened to the lever 9 at the twenty-foot distance point as measured from the lever's fulcrum 52. In the preferred embodiment, the actuators 7 represent the load. The actuators of the illustrated embodiment are configured as a standard twenty-inch diameter cylinder with an eight-inch diameter piston rod 8 on one end. This relatively large diameter rod 8 is used to provide the stability that is necessary over the eight-foot distance that the actuator's piston must travel, and also to absorb the thrust loads that are generated.

Some of the other components in the illustrated embodiment are standard off-the-shelf items, such as: high pressure hydraulic accumulators 1, high torque, high pressure hydraulic motors 2, high power electrical generators 3, and an oil reservoir with heat exchanger 4. Before the power plant is started, all of the hydraulic accumulators 1 should be pre-charged with dry Nitrogen gas to approximately 1000 psi, and all hydraulic components are filled with oil and are free of trapped air.

An Explanation of the Method of Operation of Power Plant 50 follows:

(1) The applied force vessel 10 is initially located at the uppermost position of its travel, as seen in FIG. 1, at the end of the lever assembly 9, and is filled with air at atmospheric pressure. In this floating condition, the vessel 10 of the illustrated embodiment will displace its own weight, which in the illustrated embodiment is approximately 140,000 pounds, resulting in a depth of approximately 1.14 feet of water displacement.

At this time, the associated actuators 7 are fully retracted, the air suction check valve 12 is open, the air exhaust and water flow-through valves 11 are closed, and the valves 36 are closed, and the pumps 30 in the off position. In addition, the lower portion of actuator 7 is open to the accumulators 70 and the two-way magnetic valve 20 (discussed below) is set for high pressure direction. The upper portion of actuator 7 is open to the oil reservoir 4 and the two-way magnetic valve 20 is set to suction position. The pulse controlled shutoff valves 25 are all closed except one until all accumulators 70 are charged from the impending downstroke. All bypass valves 26 (discussed below) across actuators 7 are open except for two such units during the impending downstroke. It will be understood that all of the remotely-operable valves are preferably controlled with an electronic controller, such as a remote computer system.

Generally speaking, it is preferred to allow A.F.V. 10 to float on the surface of the infinite liquid (i.e., lake 16) at this time, although there may exist operating conditions where is would be better to prevent the A.F.V. from quite reaching the surface. For example, if the infinite liquid is not weather controlled, a surface turbulence could occur, such as during a storm. During such conditions, it may prove beneficial to restrain the upwards movement of A.F.V. 10 so that its top surface would remain submerged at all times, which would somewhat shorten its vertical stroke distance, and thereby proportionately reduce its power generating capacity.

(2) An electric pulse is provided to the shutoff valves 11 and 36, which are of a special design that operate on a single pulse of current, and which are located at the top surface and base of A.F.V. 10, respectively. The application of the current pulse causes the numerous (preferably, e.g., thirty-five each) twenty-inch diameter valves 11 and 36 to open and to allow the water or other liquid (e.g., oil) to flow into and through A.F.V. 10. A small motor-generator set 28 provides pulse-type electrical power at start-up for the magnetically actuated valves 11 and 36 and for the magnetically powered pumps 30. In the illustrated embodiment, motor-generator set has a 34 HP capacity, using a standard hydraulic motor driving a standard electric generator having a 22 kW output rating.

(3) As valves 11 and 36 are opened, the A.F.V. 10 is subsequently flooded with the liquid (water) in which it is floating (e.g., lake 16). Simultaneously, the air inside A.F.V. 10 is pushed out by the incoming water through valves 11 (preferably, e.g., thirty-five) which are twenty-inch diameter flange-type shutoff valves located at the top of the A.F.V. 10, and is then vented to the atmosphere. As the water inside A.F.V. 10 nears the domed region 64 of the A.F.V., the shutoff valves 11 and the shut-off valves 36 are used to allow the liquid water to pass through A.F.V. 10 as it descends. Simultaneously A.F.V. 10 sinks by gravitational force to provide a downstroke under its own weight, minus the weight of the volume of water displaced by the A.F.V.'s physical volume (see FIG. 2).

During this downstroke, the weight of vessel 10, less its buoyancy, applies a force to the hydraulic actuators 7, via the Class II lever 9. Preferably, only two actuators are involved in this downstroke, while the remaining actuators keep their bypass valves 26 open, thereby porting oil from one side of the piston to the other. Upon initial startup, the first downstroke is preferably used to drive the startup generator 28. The downstroke extends the actuator's piston rods 8, thereby forcing oil to the hydraulic motors 67 and accumulators 70, and the hydraulic motors 67 can then drive the electric generators 28.

(4) This "net" gravity-driven force acts to provide a force that is magnified by a factor of ten times (e.g., in the illustrated embodiment) through the Class II lever 9, and the magnified force is manifested in the linear actuators 7 located at the twenty-foot position point on the lever 9, as referenced to the fulcrum point 52 of the lever 9. As related above, lever 9 is designed so that it is neutrally buoyant, and therefore, the lever's weight is essentially zero and subsequently exerts a negligible force on the system's operation.

(5) Power output from a downstroke for one A.F.V.: the A.F.V. 10 travels the distance from the surface of the source of liquid (e.g., lake 16) to a point that preferably is eighty feet below the surface of the liquid source. Therefore, the work performed is eighty feet times the net force of approximately 140,000 pounds. The work that is accomplished by the linear actuators is 140,000 pounds times ten (due to the configuration of the lever 9) or 1,400,000 pounds acting over an eight foot distance, or $11.2 \times 10^6$ lb.-ft of work. Since this work occurs in sixty seconds, power is generated yielding 186,667 lb.-ft/sec, or 339.4 Horsepower.

Since the linear hydraulic actuators 7 convert the mechanical displacement to high pressure hydraulic energy, the resulting volume of pressurized fluid that is initiated during the descent is stored in the hydraulic accumulators 70, and is available to drive a hydraulic motor 67 which subsequently drives an electric generator 28, and which subsequently provides a supply of electrical power for in-plant use. The initial "downstroke" displacement stroke provides a limited amount of power for plant operations. At this point the work input from the reference point of the floating vessel position, is near-zero (i.e., only the electrical current pulse to the valves), whereas the work output is considerable ($11.2 \times 10^6$ lb.-ft).

At the end of the downstroke, the magnetically-operated pumps 30 are energized, if that sequence is desired, to expel the liquid (e.g., water) from the interior of the A.F.V. 10. The application of a current pulse causes the numerous valves 11 and 36 to now close and to essentially seal the interior of A.F.V. 10 from the infinite liquid 16. While the liquid water is being expelled, the air check valve 12 is in its "unchecked" position, thereby allowing air to enter the interior of vessel 10 as the water leaves.

(6) Work required to evacuate the A.F.V. in 530 seconds: as A.F.V. 10 reaches the eighty-foot depth point (see FIG. 3), an electrical pulse is provided to close the shut-off valves 11 and 36 located at the top surface and base of the A.F.V. 10. Simultaneously, electrical pulse power is placed into each of the numerous (preferably, e.g., 241) magnetically powered linear displacement submersible hydraulic piston pumps 30 attached to A.F.V. 10 to start their pumping action. The level of power required to operate these specially-designed magnetic pumps is considerably less than the work output of the pumps 30. Also, the power generated and stored on the downstroke is greater than the power required to operate all of the pumps 30 for a period of 530 seconds. At this time the liquid (e.g., water or oil) initially contained within vessel 10, which in the illustrated embodiment comprises 25,120 ft³ of water (or approximately 187,910 gallons or 1,570,000 lbs. of water), is displaced from inside the A.F.V. 10 and distributed into the infinite environment (e.g., lake 16) surrounding A.F.V. 10.

The A.F.V. 10 will not rise until its buoyant force is sufficient to overcome the forces acting against it, namely the pressure from the accumulators 1 (as seen through the lever 9) and the hydraulic actuators 7, and the force of gravity. In addition, it is preferred that the vessel 10 be essentially "locked" into its lower-most position, by action of hydraulic valving that prevents the actuators 7 from moving, until all of the water has been removed from the interior of vessel 10. In this manner, the A.F.V. 10 will not begin to slowly rise as its buoyancy first overcomes the other forces acting upon it, while some of the interior water still remains within the A.F.V. Instead, the A.F.V. 10 will remain at its lower-most position until its buoyancy becomes a maximum, and, when needed, will then rise quickly to create considerable power.

The pressure on the outside surface of A.F.V. 10 at the eighty-foot depth is 34.72 psi, plus the pressure of the atmosphere above the surface of the liquid 16 in which it is immersed. The internal pressure exerted by the liquid at the base and on the inside surface of A.F.V. 10 is 5.2 psi. The inside surface of A.F.V. 10 is open to the atmosphere through a check valve 12, which is located at the highest "peak" surface of the top of A.F.V. 10. Subsequently, as pumping initiates (i.e., by pumps 30), check valve 12 provides an opening that allows the atmosphere that exists above the infinite liquid 16 to automatically flow into A.F.V. 10. Therefore, the pumping action that is required only needs to overcome the 34.72 psi pressure.

Attached to the check valve 12, which preferably is sixteen inches in diameter, is a sixteen-inch diameter pipe 5 that is fitted into the lever's structure and which provides the path to the atmosphere located above the eighty feet of water (i.e., lake 16) within which A.F.V. 10 is immersed. This pipe 5 also provides a portion of the buoyancy (~17,500 pounds) to make the class II lever 9, neutrally buoyant. At the A.F.V. 10, pipe 5 is made up of several rigid segments that are hydraulically connected to one another by three rotary unions. A rotary union 196 provides a change in direction of line 5 from the longitudinal axis of lever 9 toward the top of A.F.V. 10. A double rotary union 190 is attached at the midpoint between the fixed ends of the air supply pipe. Another rotary union 200 is attached to the top side-wall of A.F.V. 10, near the upper dome 64. Line 5 is supported by a support structure 210 along the outer surface of upper dome 64.

To effectively operate within the desired time interval of 530 seconds, the combined action of the pumps 30 must yield a flow rate of 21,273 gallons/minute with a pressure capability sufficient to overcome a head of 34.72 psi minus 5.2 psi, or 29.52 psi at the onset of pumping and 34.72 psi at the end of the pumping cycle. Therefore, using an average value of pressure of 32.12 psi, yields the combined pump capacity requirements of 21,273 gallons per minute times 32.12 psi divided by 1714, which is 398.65 horsepower, required to evacuate each such A.F.V. 10. This amounts to a requirement of $116.2 \times 10^6$ foot-pounds of work.

Power calculation for magnetically powered linear displacement piston pumps: the magnetic pumps 30 will provide 350 pounds of force acting over a net area of 9.42 inches$^2$ and for a distance of 0.6 inch per stroke. These values yield 350 pounds divided by 9.42 inches$^2$ of net area, or 37.2 psi. Additionally, 9.42 inches$^2$ times 0.6 inch deflection equals a volume of 5.65 cubic inches per stroke times two, equals 11.3 inches$^3$ per cycle times 30 cycles per second, which equals 339.12 cubic inches per second times sixty seconds per minute, which equals 20,347 cubic inches per minute divided by 231 cubic inches/gallon which equals 88 gallons per minute per pump at 37.2 psi pressure. A value of 88 gpm times 37.2 psi divided by 1714 equals 1.91 horsepower per unit times 241 pump units, equals 461.71 horsepower. The total output capability of the 241 pumps 30 over the 8.833 minute period in the illustrated embodiment is $134.58 \times 10^6$ foot-pounds.

The power that is required to displace 187,910 gallons of water at an average pressure of 32.12 psi over a 530 second time period is 398.65 horsepower, or a total work value of $116.2 \times 10^6$ foot-pounds. Comparing this value of 398.65 horsepower with the 461.7 horsepower capability of the 241 pumps yields a 15.8 percent margin of service factor capability to perform the task.

Excitation power for magnetically powered pumps: each of the specially designed magnetic pumps 30 requires 3.2 watt-seconds of excitation or input power per cycle to operate. Using a operational frequency of 30 Hz yields a 96 watt-seconds requirement which yields a power input of 70.82 pound-feet per second or 0.1287 horsepower. This value times 241 pump units yields a value of 31.02 horsepower, or $1.02 \times 10^6$ foot-pounds. The total power over a 8.833 minute period yields $9.04 \times 10^6$ foot-pounds times sixty A.F.V. units for the entire power plant (see FIG. 6 for the layout of the entire plant) equals $542.5 \times 10^6$ foot-pounds.

Mechanical power output for magnetically powered pumps: the power output per pump unit 30 is 350 pounds of force times 0.6 inch displacement which equals 210 inch-pounds per stroke, times two strokes per cycle equals 420 inch-pounds times 30 Hz, which equals 756,000 inch-pounds of work per minute or 63,000 foot-pounds per minute or 1.909 horsepower per unit pump; this is $5.56 \times 10^5$ foot-pounds of work during a cycle interval of 8.833 minutes. The total power output for 241 unit pumps yields a total effort of $134 \times 10^6$ foot-pounds times 60 A.F.V. units, which equals $8.04 \times 10^9$ foot-pounds.

Pump efficiency: the efficiency of a unit pump 30 is 1,909 output divided by 0.1287 input or 1483 percent. The total input power that is required to operate the pumps over the 530 second time period is 241 pump units times 0.1287 horsepower, or 31.02 horsepower. As mentioned the horsepower or stored energy that is available from the downstroke is 339.4 horsepower. The energy required to evacuate A.F.V. 10 of its internal 187,910 gallons in 530 seconds is $116.202 \times 10^6$ foot-pounds, or $13.155 \times 10^6$ foot-pounds per minute. The total energy stored on the downstroke per A.F.V. 10 is $11.20 \times 10^6$ foot-pounds of stored energy, which is available to use over the pumping cycle of 8.833 minutes at the rate of $1.26 \times 10^6$ foot-pounds per minute. The input power required to operate the 241 magnetic pumps 30 over the 8.833 minute period is 31.02 horsepower or $9.042 \times 10^6$ foot-pounds, or $1.02 \times 10^6$ foot-pounds per minute. The $11.2 \times 10^6$ foot-pounds of stored energy that is generated on the downstroke is obviously sufficient to supply the $9.04 \times 10^6$ foot-pounds of energy that is the required to operate the 241 magnetic pumps.

(7) Upstroke power calculation: after the A.F.V. 10 becomes fully evacuated of liquid (e.g., water or oil), the pulse current that is being supplied to the pumps 30 is stopped. The mechanical check valves 32 and 34 that are an integral part of the pumps 30 prevent back flow into the A.F.V. 10 from the infinite liquid environment (e.g., lake 16). The air/water exhaust shutoff valves 11 and 36 are closed to prevent water from flowing into the A.F.V. 10. Oil is ported to the accumulators 1 and is also available to the hydraulic motors 2 for driving the electric generators 3.

The weight of the water that has been displaced is significantly greater that the weight of the empty A.F.V., and therefore, vessel 10 will rise with a net force equal to the weight of the displaced water minus the weight of the empty vessel. In the illustrated embodiment, the A.F.V. 10 will be buoyed up with a force of 1,570,000 pounds of force and will act under this force over a distance of eighty feet, thereby producing $125.6 \times 10^6$ foot-pounds of work. Once the hydraulic system that includes the hydraulic actuators 7 and hydraulic accumulators 1 is placed into a mode that allows movement of the piston rods 8 of the actuators, the lever 9 and A.F.V. 10 combination will be allowed to rise. The time that this work occurs is about ten seconds, which yields 22,838 horsepower or approximately 17 megawatts of power.

If desired, the upward movement of the A.F.V. 10 can be stopped at any point in its travel by hydraulic valving, if it is determined that sufficient stored energy is now available in the hydraulic accumulators. Each A.F.V. that stops short of its uppermost position acts as a very inexpensive giant accumulator of stored (potential) energy. By use of a computer-controlled system, the A.F.V.'s upward motion can be programmed to provide as little as a few gallons of highly pressurized hydraulic fluid (e.g., oil), or up to 133,000 gallons of 3000 psi pressurized fluid. It would require 5320 forty-gallon accumulators to store that quantity of pressurized fluid at 3000 psi.

Exchange of mechanical power to hydraulic stored energy: during the upstroke, the applied force is transmitted through the lever 9 to the double acting single ended linear hydraulic actuators 7. A force of 15,700,000 pounds is applied to the load (i.e., the hydraulic actuators) over a distance of eight feet, which is a net force transmitted to the actuators 7 by the lever 9 that is multiplied by the mechanical advantage of the lever (a factor of ten in the illustrated embodiment). The work associated with this displacement is $125.6 \times 10^6$ foot-pounds and the time for this displacement to occur is ten seconds, thereby yielding a power of 22,838 horsepower. The mechanical energy that is placed into the linear actuators 7 is converted into a high pressure hydraulic energy and either is stored in the hydraulic accumulators 1 for subsequent use by the standard hydraulic motors 2, or it can be ported directly to the hydraulic motors 2, and then converted into electrical energy by electric generators 3.

Actuator specification and power calculations: approximately seventeen twenty-inch diameter linear hydraulic actuators 7 are required to accommodate the 15,700,000 pounds of force generated by the upward power stroke of the power plant 50 of the illustrated embodiment of the present invention. A twenty-inch diameter cylinder contains an area of 314 square inches. Each cylinder will have the capability to generate high pressure oil at 2941 psi, which means each cylinder will require 923,529 pounds of force to yield hydraulic oil at the 2941 psi level. The volume of each cylinder is 314 times 96 inches or 30,144 cubic inches, which will yield 130.49 gallons of hydraulic oil at 2941 psi. Seventeen units×130.49 gallons yield 2218.33 gallons per stroke. The time period for the displacement stroke is ten seconds which yields 221.833 gallons per second. A value of 221.833 gallons per second times sixty seconds equals 13,309 gallons per minute of 2941 psi hydraulic oil, which corresponds to 22,838.19 horsepower. The actual total amount of energy generated that has been converted to hydraulic energy and stored in hydraulic accumulators is $125.61 \times 10^6$ foot-pounds, which is equal to the mechanical energy developed in the upstroke. The number of forty gallon accumulators to store the 2218.33 gallons that results from one A.F.V. 10 is approximately 89 units.

Accumulator sizing and storage capacity: the forty gallon accumulators 1 preferably will contain a pre-charge of dry Nitrogen gas at 1000 psi. As the linear actuators 7 displace their high pressure hydraulic fluid (at 2942 psi) into the accumulator, the Nitrogen gas is compressed to 2942 psi, which yields approximately 25 gallons per accumulator of stored high pressure hydraulic fluid. Approximately 89 accumulators can hold the total charge of one A.F.V. 10 power cycle. Obviously, it would require 5280 accumulators to store $7.53 \times 10^9$ foot-pounds of hydraulic energy. This stored energy would be sufficient to generate electrical power at the rate of 17.1 megawatts for a period of ten minutes, or could be used to generate a short-term "peak" output of 171 megawatts for a period of one minute.

Description of Operation of Multiple Units that make up the Power Plant

Figure 7:
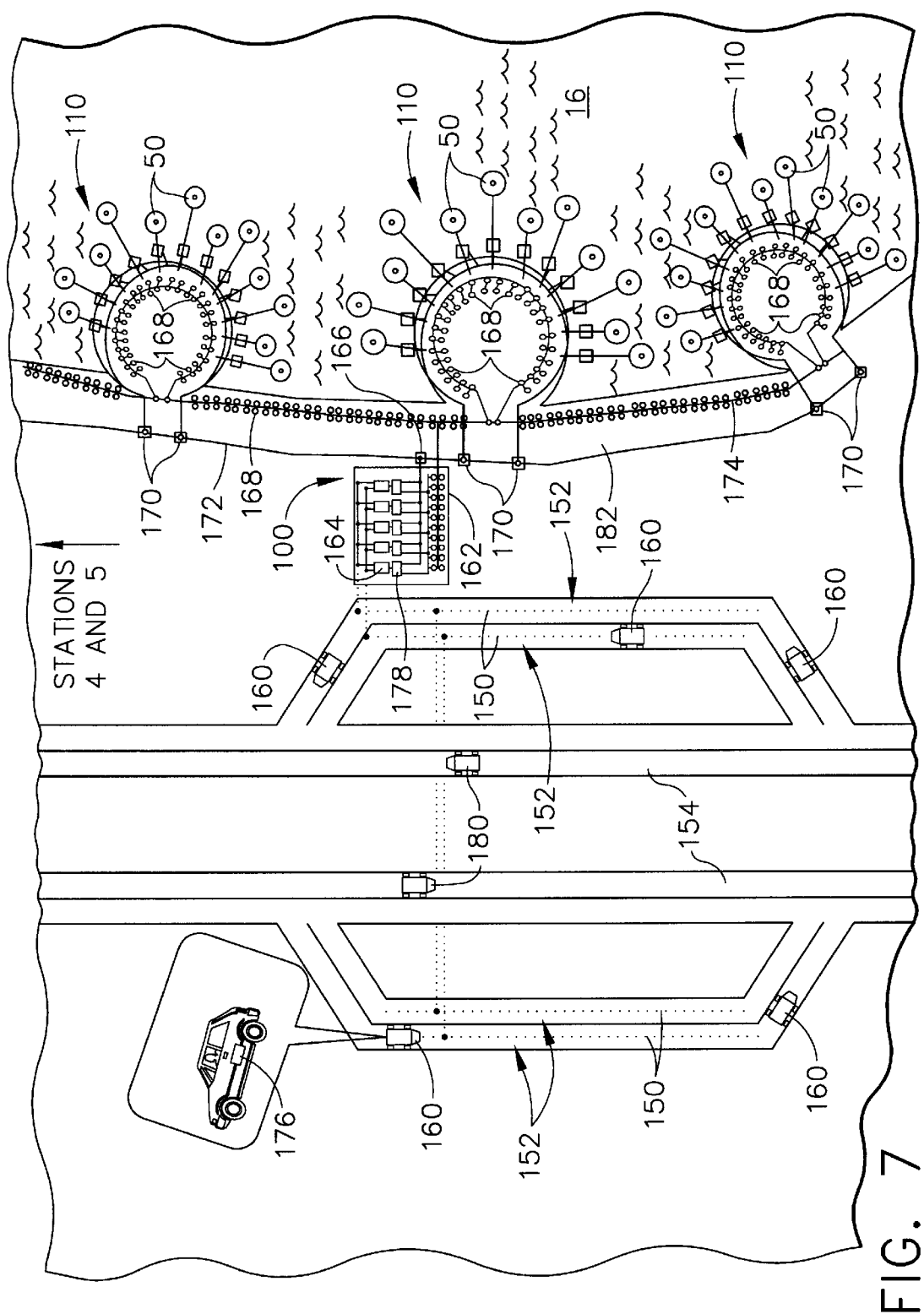
FIG. 7 is a diagrammatic view of a Dynamic Power Supply Station as constructed according to the principles of the present invention, which uses as its power source one of the electrical generating power plant shown in FIG. 1.

In order that the 17.1 megawatts of power be available on a continuous basis, an advantageous configuration for a power plant 100 is illustrated in FIG. 7 depicting thirty-six of the recommended (for this illustrated embodiment) sixty of the lever 9 and A.F.V. 10 assemblies 50 (or "units") into an array of three of the recommended five "stations" 110, each containing twelve units 50. It is preferred, for the purposes of describing the present invention, that five stations 110 be connected together to make a single power plant 100, in which there would be at least sixty of the units 50. At the beginning of the power cycle, all sixty units 50 are generating power on the downstroke simultaneously. Therefore at the end of the 60-second downstroke period, sixty A.F.V. 10 assemblies (units) will have generated $672.0 \times 10^6$ foot-pounds of work or 20,363.9 horsepower which, compared to the $542.5 \times 10^6$ foot-pounds required by the magnetic pumps 30 to evacuate sixty A.F.V.'s 10, yields sufficient power to operate these magnetic pumps 30 over a time period of 530 seconds. The water evacuation phase for all sixty units 50 can, therefore, be started simultaneously, at the end of the downstroke portion of the cycle.

At the end of the evacuation phase for the sixty A.F.V.'s 10, the upward power stroke is selected based on the need (i.e., the system demand for electrical energy output). The power stroke cycle time at this point is 590 seconds. The plant operator has several choices at this point: the operator can allow one A.F.V. 10 to rise every ten seconds, which means that every minute over a period of ten minutes, six A.F.V.'s 10 would be generating their respective power at a rate equal to 22,868 horsepower, which would yield a continuous power output of this value for as long as is desired. It will be understood that, using this mode of operation, as the first A.F.V. 10 starts its second upward power stroke, the sixtieth A.F.V. 10 is completing its first upstroke, and the downstroke and the subsequent evacuation phase of the power cycle for each A.F.V. 10 immediately follows after the upstroke. In this system configuration, only a limited number of accumulators are required for storage purpose since the rate of the power usage is nearly equivalent to the rate of power generation.

As related above, the upstroke for all units 50 can be initiated simultaneously, which would yield $7.536 \times 10^9$ foot-pounds of work in a ten second time period, producing a power "pulse" of $1.370 \times 10^6$ horsepower. In this scenario, 2218.33 gallons times sixty units 50, or 133,099.8 gallons of high pressure hydraulic fluid, would be available for storage or use. In the case of storage, 5324 accumulators 1 having an actual storage capacity of twenty-five gallons each would be required to store this amount of fluid. The stored energy, at this point in the cycle, which corresponds to the ten-minute point or the 600-second point, would be $7.536 \times 10^9$ foot-pounds, which is equivalent to 228,381 horsepower for one minute or 170.37 megawatts for one minute, or 22,838 horsepower or 17.1 megawatts over the ten-minute period. As related above, using the ten-minute period for power consumption rate, 17.1 megawatts of power is made available for use on a continuous basis.

It will be understood that peak power generation can be provided for one minute at the 170.37 megawatt rate, or a constant power generation rate of 17.1 megawatts can be maintained indefinitely. Once a power cycle at the 170.37 megawatt rate has occurred, this quantity of power in hydraulic energy will be re-established and available so that the 17.1 megawatts of continuous usage can be accommodated. It will be further understood that the duty cycle is totally flexible and can easily accommodate periods of peak electrical demands depending on the number of accumulator storage units 1 and the number of motor-generator units (at index numerals 2 and 3, respectively) available.

In the illustrated embodiment, twenty-five motor-generator sets 2, 3 have been provided which could all operate simultaneously or individually to yield a power plant 100 that can generate 17 megawatts of continuous electrical power. The twenty-five hydraulic motors 2 that drive standard electric generators 3 would be sized to provide 1000 horsepower to each electrical generator 3 which, in turn, would provide 0.746 megawatts of electrical power. Each unit 50 would require 582.8 gallons of hydraulic fluid per minute at 2941 psi to yield 1000 horsepower to drive the 0.746 megawatt capacity electric generators 3. As the electrical demand changes or if a peak demand of 170 megawatts is required, additional units 50 can be installed and started, or they can be placed on standby or removed from service automatically in order to accommodate this level of power. The torque and rpm of the hydraulic motor 2 is a variable which depends on the rpm rating selected for the electric generator 3. The entire power plant 100 preferably will be computer controlled for ease in selecting duty cycles for each of the units 50.

It will be understood that variables such as the number of pumping units, number of power levers, the magnification ratio of the lever, the depth which the lever travels, the amount of hydraulic storage units, the number of hydraulic motor generator sets, the number of units operated simultaneous or in the sequence identified, all contribute to the flexibility of the design without departing from the principles of the present invention. The detailed design of the illustrated embodiment also incorporates special features which provides a great deal of flexibility for the maintenance and repair of all the components involved.

The input power required to operate this power plant 100 of the present invention is negligible compared to its power output or yield, mainly because of the low power requirements to operate the special pumps 30 and valves 11 and 36. This input power is easily provided from a portion of the power that is generated on the power downstroke of the lever 9-A.F.V. 10 units 50, during which time energy is stored in the hydraulic accumulators 1.

Efficiency of a sixty unit lever-A.F.V. power plant system: the total power output of a sixty unit power plant constructed according to the illustrated embodiment of the present invention consists of $11.20 \times 10^6$ foot-pounds per unit per downstroke plus 125,600,000 foot-pounds per unit per upstroke, or $136.80 \times 10^6$ foot-pounds of energy per unit 50 times sixty units, thereby yielding $8.2 \times 10^9$ foot-pounds for one complete power cycle. The work input to accomplish this is $1.023 \times 10^6$ foot-pounds times 8.833 equals $90.42 \times 10^6$ foot-pounds times sixty units 50, which equal $5.43 \times 10^8$ foot-pounds. Dividing work output by work input equals an apparent efficiency of 1514 percent.

The maximum energy contained in each magnetic pump 30 operating under the conditions related above is $6.8 \times 10^4$ foot-pounds per minute times 8.833 minutes per duty cycle, equalling 606,827 foot-pounds times 241 pump units per A.F.V. 10, which equals $146.25 \times 10^6$ foot-pounds times sixty units 50, thereby yielding $8.77 \times 10^9$ foot-pounds. The energy output divided by the energy input equals 93.5 percent. Obviously, this efficiency value is relatively low compared to the 1514 percent obtained for the work output divided by the work input.

Description of Components of Illustrated Embodiment

A detailed description of the components employed in the illustrated embodiment of FIGS. 1–5 shows that many of the components are presently available, off-the-shelf items. For example, the multiple hydraulic accumulators 1, used to store hydraulic fluid under pressure, preferably are rated for 4000 psi and a forty gallon capacity. The hydraulic motors 2, which provide power to electric generator 3, preferably are rated at 1000 HP, and for each unit 50, there are preferably twenty-five such motors 2. In addition, each unit 50 will preferably also include a smaller hydraulic motor 70, rated at 35 HP, for providing power for the in-house electric generator upon start-up. Correspondingly, each unit 50 will preferably contain twenty-five electric generators 3, rated at 0.746 megawatt each, for providing power for consumers. In addition, each unit 50 will preferably also include a smaller 22 kW electric generator 28 to provide power for plant operations.

Each unit 50 will preferably contain an oil reservoir and heat exchanger 4 which will provide an oil supply for hydraulic cylinders 7 and hydraulic motors 2. Depending upon the precise timing cycle used and the number of accumulators 1 in the unit 50, there could be more than one oil reservoir 4. In the illustrated embodiment, the oil reservoir 4 requires a sufficient size to handle a 13,320 gpm usage rate.

An air suction line 5 is required in each unit 50 to supply air from the atmosphere at a rate of 2843 CFM in the illustrated embodiment. This line 5 preferably comprises a sixteen inch diameter pipe. A perforated screen 22 is provided to prevent ingestion of wildlife into the air suction line 5 and A.F.V. 10. This screen 22 preferably has a sixteen inch diameter and is metallic in construction.

Each unit 50 requires at least one hydraulic actuator 7. In the illustrated embodiment, the preferred actuator(s) comprise seventeen actuators per unit, or 1020 actuators for a power plant containing sixty A.F.V. 10 units. Each actuator 7 preferably comprises a standard twenty inch diameter double acting, single-ended hydraulic actuators with an automatic bypass valve, and with pivots at both ends, and with an eight-inch diameter piston rod on one end. The bypass valve preferably is a 1½inch diameter submersible type. The actuators 7 transfer mechanical energy into hydraulic energy, and allows oil to pass from one end of the actuator to the other end through the bypass valve. Each actuator 7 preferably includes a large diameter hydraulic piston rod 8 which provides stability for an eight foot deflection required in each upstroke/downstroke cycle of the A.F.V. 10.

The Class II lever 9 used in each unit 50 transfers force from the A.F.V. 10 to the linear actuator 7. In a power plant 100 having sixty A.F.V.'s 10, there would also be sixty levers 9. Each lever 9 preferably comprises a steel lever framework that is fitted with buoyant material that is designed to yield a neutrally buoyant structure that contains the sixteen inch diameter air suction line 5 and electric cables 6 to power the valves and pumps on the A.F.V. 10.

Each unit 50 will have an Applied Force Vessel 10 pivotally attached to the movable end of the lever 9 which generates the primary force for the power plant 100. In the illustrated embodiment, A.F.V. 10 preferably is fifty feet in diameter and 12.8 feet in height. The preferred A.F.V. is domed at both ends, and is made of steel with large flanges on both its top and bottom surfaces. It will be understood that the A.F.V. must be reinforced to withstand the forces it will undergo from both pressure and buoyancy considerations. Preferably, this special reinforcement will be constructed within the internal portions of the A.F.V.

The A.F.V. 10 includes multiple shutoff valves that must pass both air and water (at least in the illustrated embodiment—as related above, other liquids could be used for the infinite environment 16, and other fluids besides air could be placed above the infinite environment 16). The preferred shutoff valves 11 and 36 will be of the flange type with a submersible capability, and will be placed at the uppermost and lowermost surfaces of A.F.V. 10 to allow either air or water to flow through the interior spaces of the A.F.V. In the illustrated embodiment, thirty-five each such shutoff valves 11 and 36 are placed on the A.F.V. 10, in which valves 11 and 36 each have a twenty-inch diameter. This quantity of shutoff valves 11 and 36 of the above ratings will allow 25,120 cubic feet of air and 1,252,737 gallons of water to displace in sixty seconds from and through A.F.V. 10 at a velocity of approximately 35 feet per second.

The air check valve 12 located in air line 5 preferably is a spring-loaded flange-type bronze check valve rated for air/water usage with a 125 pound capacity, and sixteen inches in diameter. Its design criteria is to allow 25,120 cubic feet of air to enter A.F.V. 10 over a period of 530 seconds, which is equal to 2,843 CFM.

The pumps 30 that are installed within A.F.V. 10 preferably are remotely controlled and of submersible linear displacement magnetically powered water piston construction. Each A.F.V. 10 preferably contains 241 of these pumps 30, which displace water from the A.F.V. at its lower-most (eighty-foot) position into the infinite environment 16. Each pump 30 of the illustrated embodiment has a 88.08 gallon per minute capacity at a head of 34.5 psi, and has a bronze manifold and cylinder.

Associated with each pump 30 are two bronze suction check valves 32 that prevent fluid from entering the cylinder chamber during the pressure cycle. Check valves 32 are designed to work in a water environment in the illustrated embodiment, and preferably have a one inch diameter and are capable of working against a 34.5 psi head. Two bronze discharge check valves 34 are also associated with each pump 30 that prevent high pressure fluid from back-flowing into the cylinder during the suction cycle. Valves 34 can be of the same construction as valves 32.

Each A.F.V. 10 preferably contains multiple remote controlled shut-off valves 11 and 36 that allow water to flow into and through the A.F.V. during a downstroke cycle, and also prevents water from entering the A.F.V. 10 during an upstroke cycle. Valves 11 and 36 preferably are magnetically operated and submersible in water. In the illustrated embodiment, thirty-five such valves 11 and 36 each are used with A.F.V. 10, each valve 11 and 36 having a twenty inch diameter and an opening force capability of 242 pounds.

The concrete dock wall 14 of the illustrated embodiment provides support for the linear hydraulic actuators 7 and the lever 9-A.F.V. 10 assembly. Wall 14 is preferably made of a steel reinforced concrete construction with a clevis assembly. A steel support structure 23 is provided to mount one end of the linear actuators 7 to a fixed location. It is preferred that a building 17 be provided to house the major non-submersible components of power plant 100.

Electrical input power lines 6 are required to transmit electric power to valves 11 and 36, and pumps 30. Power lines 6 preferably are copper conductors that have the capacity to handle 25 kW of power per A.F.V. 10. The electrical output of the power plant is preferably a set of electrical distribution lines 18 that are run in parallel from the output side of the electrical generators 3. These lines 18 preferably are rated at 170 mW of power for short term duty, and have a continuous rating of at least 17 mW. Another set of electrical lines 21 are provided to power the plant operations. Lines 21 preferably comprise copper conductors capable of carrying 25 kW of power, which provide electrical pulses to the magnetic pumps 30 and the magnetic valves.

For ease of maintenance, manually operated shut-off valves 15 are preferably installed in the hydraulic lines to the motors 2, and to the accumulators 1. Standard high pressure (e.g., 3000 psi rating) valves for hydraulic fluid duty can be used. A high pressure check valve 19 is preferably installed at each unit 50 to prevent high pressure hydraulic fluid from back-flowing to the linear actuators 7. Check valve 19 preferably is of standard construction for hydraulic fluid service and rated at 3000 psi.

Another element of the hydraulic system for power plant 100 is a set of remote controlled two-way magnetically operated high pressure valves 20 to provide direction control for high pressure hydraulic fluid and suction fluid from the reservoir 4. These valves preferably have a three-inch capacity and operate in an air environment. In the illustrated embodiment, 120 of these valves 20 are provided, and operate at 3000 psi capacity at a flow rate of ten feet per second.

A high pressure hydraulic line or high pressure rotary union 24 is provided which must accommodate the pivoting action of the hydraulic actuators 7. In the illustrated embodiment, thirty-four such lines are required per A.F.V. 10, in which each line is rated for a flow rate of 13 gallons per second, and are constructed of five inch diameter high pressure pipe, with a 3000 psi capacity pressure head, and at a pressure drop of 30 psi at the rated flow rate. A magnetically operated actuator bypass valve 26 is provided to allow oil to bypass from one end of the actuators 7 to the other end for those actuators 7 that are not producing high pressure fluid during the downstroke operation. This prevents fluid from being pumped to the reservoir 4 and returning the same fluid via the suction line 5 to other side of actuators 7. Valve 26 preferably is submersible and has two inch pipe ports, and is rated up to 3000 psi. In the illustrated embodiment, valve 26 is remote controlled, and can be operated in the open or closed position during a downstroke.

A set of high pressure magnetically operated shut-off valves 25 are provided for remote control capability for the operation of the motor/generator sets. In the illustrated embodiment, twenty-five such valves 25 are required per 17 mW power plant. Valves 25 are preferably rated for 3000 psi, and are three-inch diameter valves. Manually operated pressure reducing valves 27 are provided to adjust the operating pressure based upon the current accumulator pressure in the power plant. In the illustrated embodiment, a quantity of twenty-five standard valves can be used per 17 mW power plant.

FIG. 7 shows a general layout of an electric vehicle recharging station. The power plant 100 provides electrical power to a series of "on-the-fly" recharging conductors 150 that are embedded in roadways 152. These recharging roadways 152 are essentially access roads that can connect to a major road 154. Electric vehicles, as depicted by the index numerals 160, can move over the conductors 150 and acquire electrical charge while moving, without contact, via a magneto principle of operation. The electric vehicles 160 would typically be of a type that contains a set of large storage batteries, as indicated by the index numeral 176.

Other vehicles are depicted on FIG. 7 that are not being charged, as indicated at the index numeral 180. These non-charging vehicles could be of a type described in co-pending commonly-owned U.S. patent application, Ser. No. 08/387,403, titled MAGNENCALLY-POWERED PUMP, VALVE, AND VEHICLE, filed on Feb. 10, 1995, and which, as related above, is expressly incorporated by reference herein.

Some of the general equipment elements of power plant 100 are depicted in FIG. 7. For example, numerous hydraulic accumulators used for pressurized fluid storage are located at each station 110 at the index numerals 168. These accumulators 168 are hydraulically connected to other accumulator storage along a common hydraulic supply line that runs between stations, as indicated at index numeral 174. The supply line also runs into the plant's building to further hydraulic accumulators, at index numeral 162, which are in hydraulic communication with hydraulic motors 178 (which are equivalent to motor 2 on FIG. 1). These motors 178 drive electric generators 164 (which are equivalent to generator 3 on FIG. 1). A return line oil reservoir 166 is located outside the plant building, and is in hydraulic communication with a hydraulic oil suction/return line 172. Other hydraulic oil reservoirs 170 are preferably also located along suction/return line 172.

In the illustrated embodiment of FIG. 7, the general layout of each of the stations 110 provides numerous units 50 in which the crane-like lever and A.F.V. assemblies are spaced-apart in a somewhat radial manner, so that each unit's lever-A.F.V. can be immersed within the infinite liquid 16 without interfering with any other such unit 50. A maintenance road 182 is also provided between stations 110, preferably along the path of the supply line 174 and return line 172.

Description of Alternative Embodiment

Figure 2:
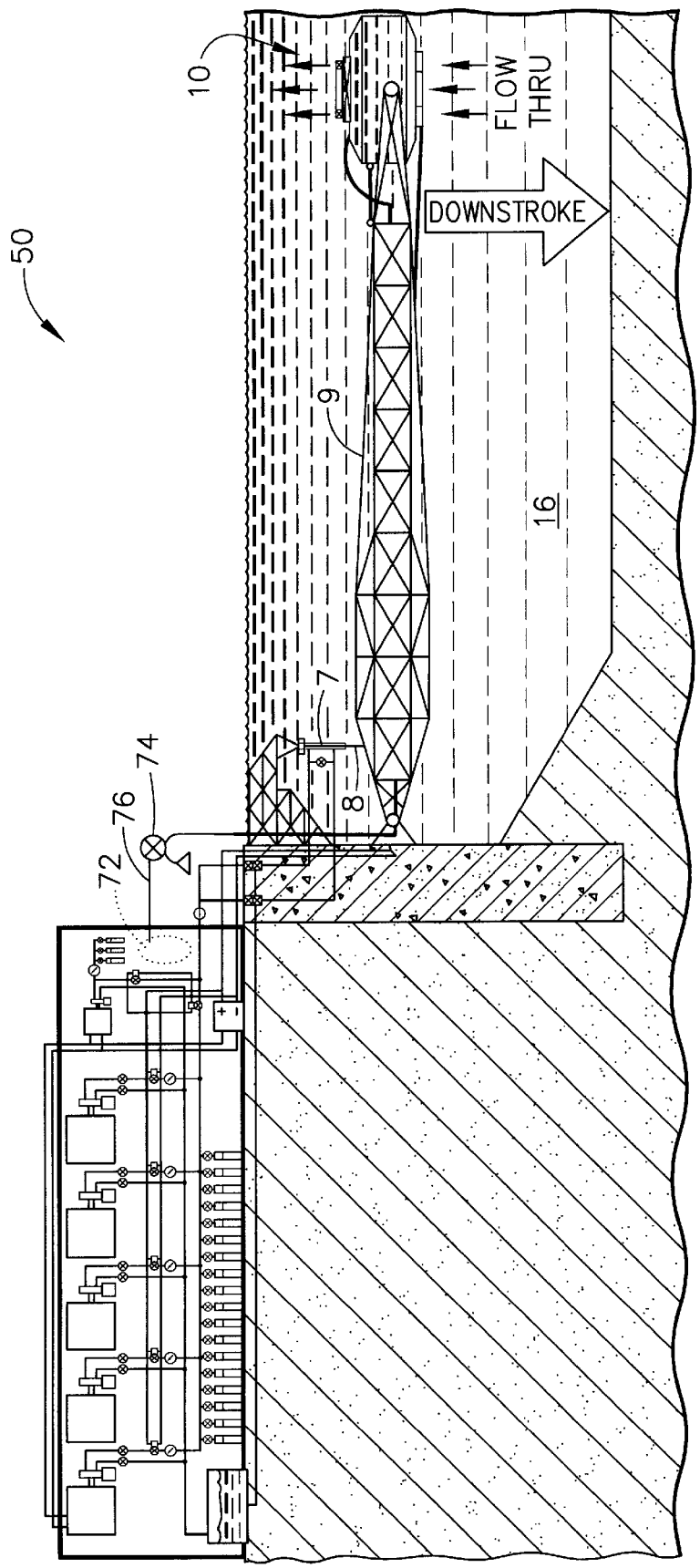
FIG. 2 is a diagrammatic view of the electrical power plant and unit of FIG. 1, in which the applied force vessel is filled with infinite liquid medium passing therethrough, and is presently in its downstroke mode.
Figure 3:
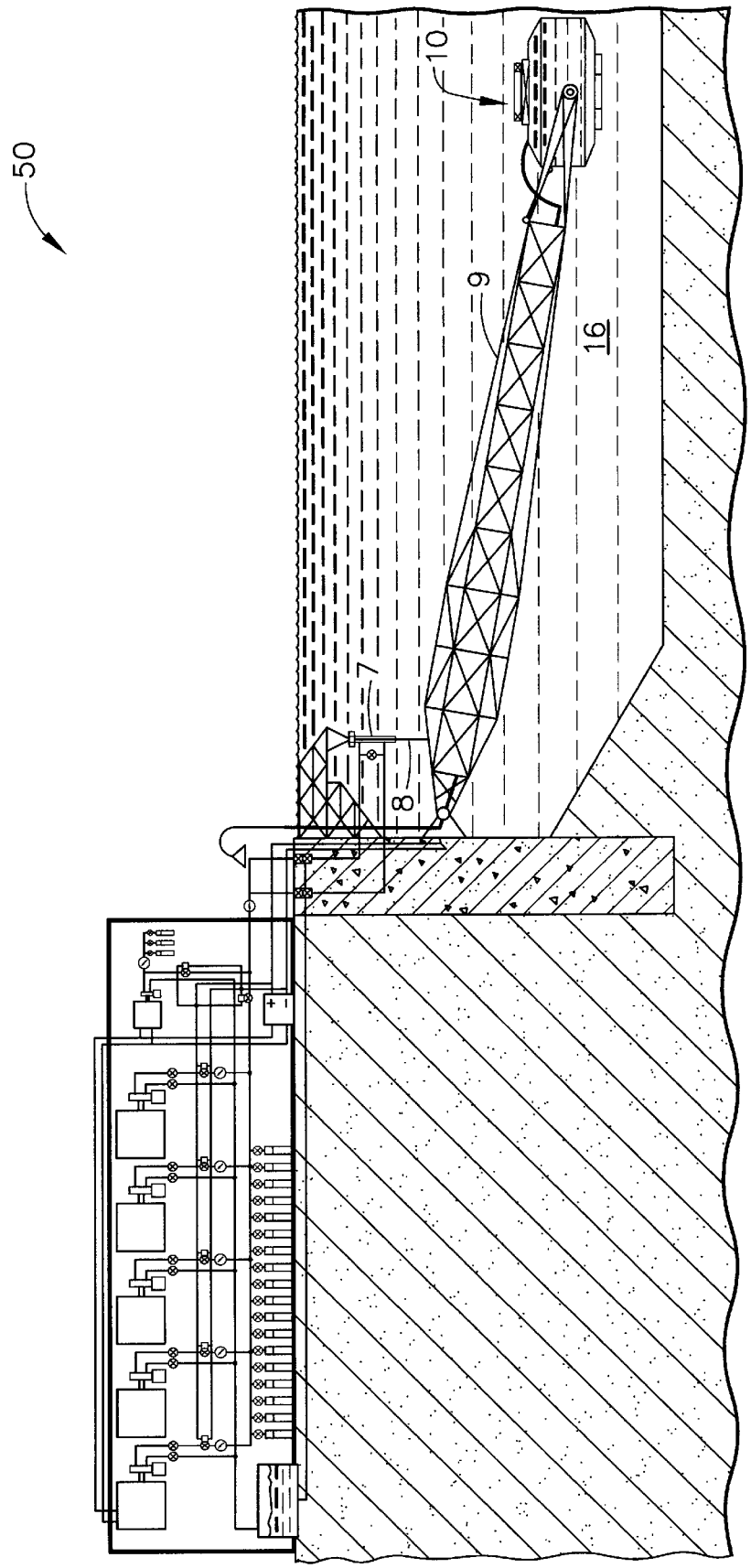
FIG. 3 is a diagrammatic view of the electrical power plant and unit of FIG. 1, in which the applied force vessel is located at its bottom-most movable position, and in which the vessel is filled with the infinite liquid medium.
Figure 4:
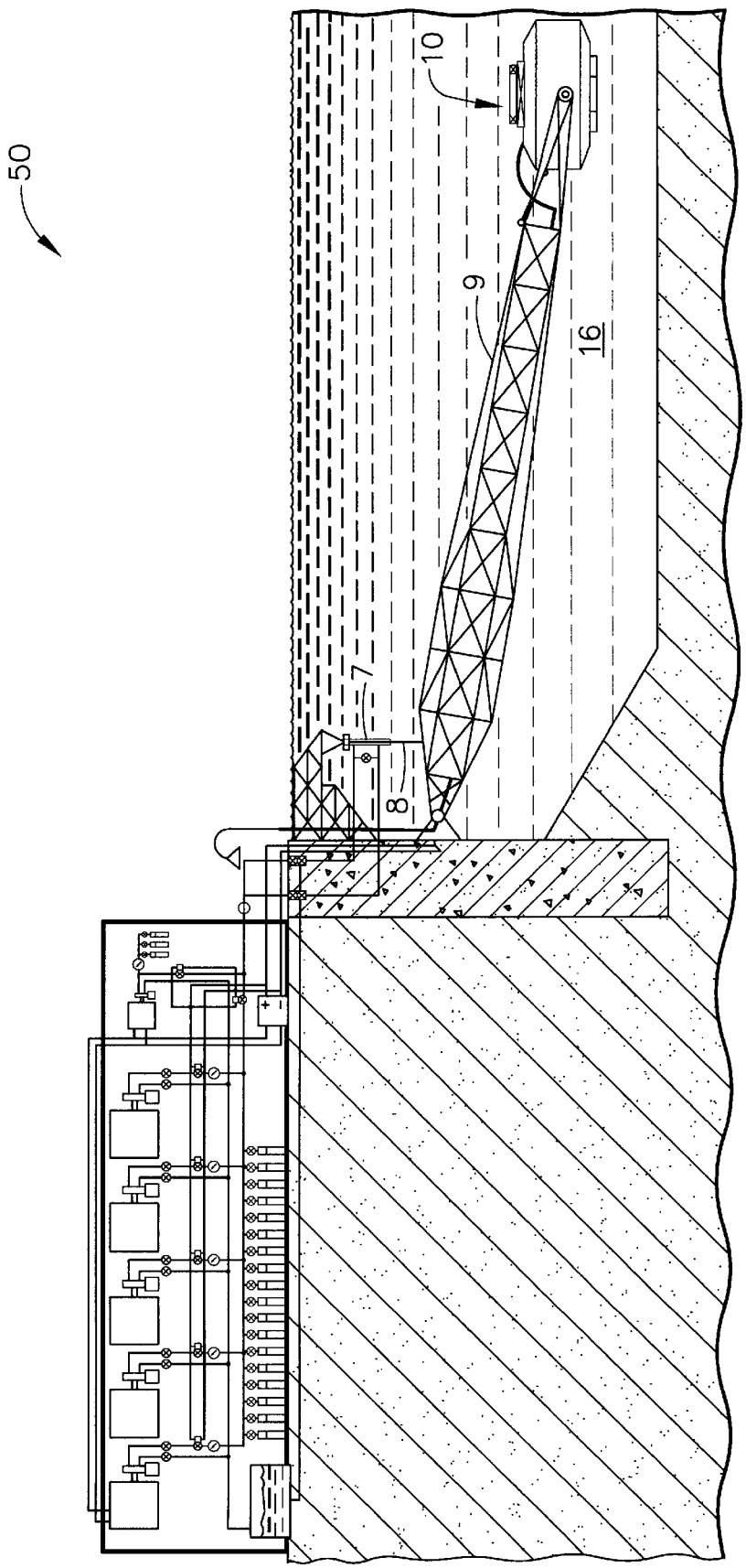
FIG. 4 is a diagrammatic view of the electrical power plant and unit of FIG. 1, in which the applied force vessel is located at its bottom-most movable position, and in which the vessel is empty of the infinite liquid medium.
Figure 5:
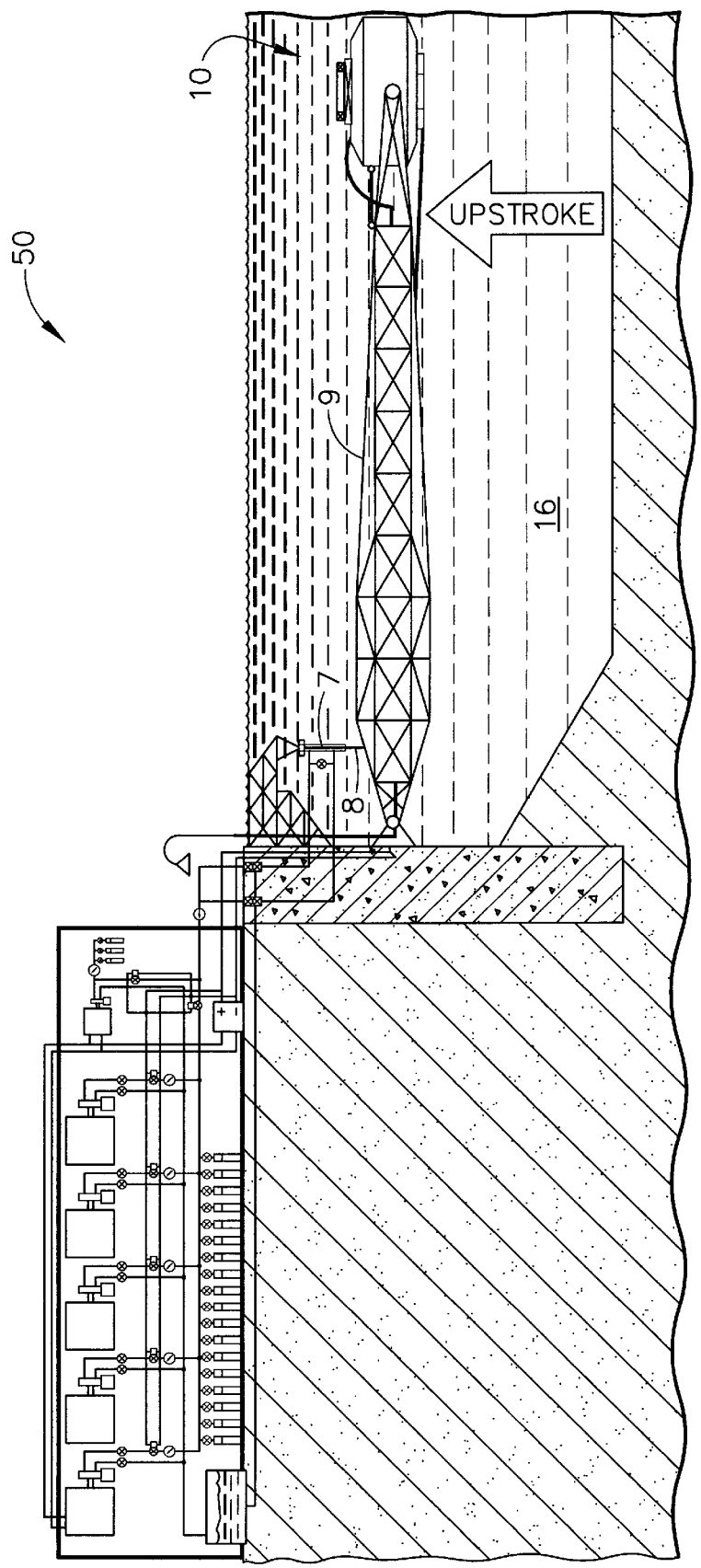
FIG. 5 is a diagrammatic view of the electrical power plant and unit of FIG. 1, in which the applied force vessel, now empty of the infinite liquid medium, is in its upstroke mode.

In FIG. 2, an optional source of pressurized air or gas is generally depicted by the index numeral 72. This pressurized air/gas can be used to evacuate the A.F.V. 10 of liquid (rather than using pumps such as pumps 30) by blowing pressurized air/gas through the air line 5 into the upper interior space of A.F.V. 10, while opening the bottom valves 36 to allow the liquid to escape from the vessel. This would allow the A.F.V. 10 to have fewer components (i.e., the pumps 30 and their associated check valves 32 and 34), but of course would require the addition of a large air compressor (or compressors), or a steam generator as part of the pressurized air/gas source 72. The pressured air used for this purpose can be any pressurized gas that is able to evacuate the liquid, and could be, for example, a gas that is used for refrigeration purposes, steam, or dry air, etc.

During the evacuation of liquid step, an air/gas valve 74 compatible for sixteen inch pipe would be positioned so that the path was open between air line 5 and another air line 76, which preferably is also sixteen inch pipe. This allows the pressurized air (or, for example, steam or other gas) to flow from the source 72, through valve 74 and air/gas line 5, and into the interior of A.F.V. 10. During the other stages of the power cycle, air valve 74 is in the closed position. The pressurized air/gas used to evacuate A.F.V. 10 of water/liquid would then be vented to the atmosphere through valves 11 so as to allow air/gas from within the interior of A.F.V. 10 to escape directly to atmosphere during a downstroke of the A.F.V., while liquid is entering its interior within the desired sixty second time period. If a reusable refrigerant is used to evacuate A.F.V. 10, a compressor would be required to act upon this gas so as to change it back to its liquid state.

An extension of the existing inventions is to use a specific charge of high pressure steam over a very short period of time, to evacuate the liquid from the A.F.V. 10. Check valves will automatically prevent the liquid from reentering the inside volume of the A.F.V. Simultaneously the A.F.V.'s internal volume is opened to the atmosphere (air). When using a given charge of high pressure steam, the mobility of the superheated steam molecules is very high at first, then decreases to cause less pressure and a decreasing temperature until a point of equilibrium is reached, whereby the internal pressure of A.F.V. 10 becomes equal to the atmosphere. At that point, the A.F.V. is automatically opened to the ambient atmosphere that exist above the surface of the infinite liquid. Under this scenario, the kinetic energy that exists in each incremental charge of superheated steam is being used to its maximum potential.

The use of a fixed charge of steam requires air at atmospheric pressure be readily available to replace the steam's contracting volume, thereby always maintaining a positive pressure of at least one atmosphere within A.F.V. 10. The bi-product of the steam is obviously water which will be produced primarily as condensate that will occur at the surface of the steam and water interface that exists within the A.F.V. Therefore, a significant amount of the condensed steam will be displaced from within A.F.V. 10 along with the initial liquid that is being displaced into the infinite environment. The power stroke timing and the amount of steam charge required will be a function of the A.F.V. size, the depth of its vertical travel, the size of the water exhaust valves, and the point at which a particular charge of steam reaches a temperature and pressure that is sufficient to allow air at atmospheric pressure to enter the A.F.V.

Under this scenario, ambient air will be displaced from A.F.V. 10 during the next sinking cycle only after the A.F.V. has completely traveled to its maximum depth and the upper and lower shut-off valves have been closed. A limited charge of high pressure steam will be required to displace the liquid from within the A.F.V. All other capabilities that exist for the above-related A.F.V. which uses submersible pumps to displace the liquid are also applicable for this system. Typically, a charge of 750 psi steam at 700° F. would follow a pressure, volume, height relationship as shown in Table #1, below:

TABLE #1

| Time | Pressure (psi) | Proportion of volume of remaining water in A.F.V./ total A.F.V. volume | Height of water remaining in A.F.V. |
| --- | --- | --- | --- |
| 0–1 | 750 | 1.0 | 12.8 |
| 1–2 | 375 | 0.5 | 6.4 |
| 2–3 | 187.5 | 0.25 | 3.2 |
| 3–4 | 93 | 0.125 | 1.6 |
| 5–6 | 46.5 | 0.0625 | 0.8 |

As the pressure in the original charge of steam decreases because of the displacement of the water, the temperature will also decrease because of the thermal conductivity and, therefore, this effect will also cause the pressure in the steam to decrease.

Using this scenario the time span for recharging or evacuating the A.F.V. can be decreased considerably and fewer A.F.V. systems will be required to accomplish the same power output. In this scenario, fossil fuel or nuclear fuel will be required to heat the water to its operating temperature and pressure. The overall economies of this system may be quite attractive if thermal energy is easily available such as geothermal, or waste heat from any source, etc.

The important aspect of the design, using superheated steam to evacuate the A.F.V. is its expanded volume condition due to temperature along with its inherent pressure capability are both utilized to their maximum potential on each cycle of use.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A power generating system, comprising:
   (a) a first structure having a pivot point;
   (b) a movable lever having a first end and a second end, said first end being pivotally attached to said pivot point, said second end being vertically movable with respect to said pivot point;
   (c) an applied force vessel operationally attached to the second end of said lever, said vessel comprising a hollow container having at least one through-hole in its upper lid, and at least one through-hole in its lower base, said vessel having at least one upper valve mounted proximal to at least one through-hole in the upper lid of said vessel, at least one lower valve mounted proximal to at least one through-hole in the lower base of said vessel, and at least one pump mounted proximal to another one of said at least one through-hole in the lower base of said vessel;
   (d) a pipe having a first end and a second end, said first end being operationally attached to another one of said at least one through-hole in the upper lid of said vessel, the second end of said pipe extending to a source of gas;
   (e) a linear displacement device having a first end and a second end, said first end being operationally attached to said first structure, said second end being operationally attached to said lever; and
   (f) a source of liquid having a volume greater than the external volume of said vessel;
   wherein, said vessel is configured to move downward due to the force of gravity when said at least one upper valve and at least one lower valve are opened, thereby allowing liquid from said source of liquid to enter and pass through the interior space of said vessel;
   said at least one pump operates to substantially remove the liquid from the interior space of said vessel, while gas from said source of gas enters the interior space of said vessel via said pipe, and said vessel is further configured to move upward due to the buoyant force created by displaced liquid when said at least one upper valve and said at least one lower valve are closed; and
   said linear displacement device is configured to extend when said vessel moves downward and is forced to retract when said vessel moves upward.

2. The power generating system as recited in claim 1, wherein said linear displacement device comprises a linear-motion hydraulic actuator, and further comprising at least one hydraulic accumulator which stores pressurized hydraulic fluid that is received from said linear-motion hydraulic actuator.

3. The power generating system as recited in claim 1, wherein said linear displacement device comprises a double-acting linear-motion hydraulic actuator, and further comprising at least one hydraulic accumulator which stores pressurized hydraulic fluid that is received, during both the extension and retraction strokes, from said linear-motion hydraulic actuator.

4. The power generating system as recited in claim 1, wherein said linear displacement device comprises a linear-motion hydraulic actuator, and further comprising at least one hydraulic motor and electrical generator set, said hydraulic motor receiving pressurized hydraulic fluid from said linear-motion hydraulic actuator, and said hydraulic motor driving said electrical generator.

5. The power generating system as recited in claim 1, wherein said system stores potential energy by halting said lever and vessel at their uppermost position, halting the operation of said at least one pump, and maintaining said at least one upper and lower valves in their closed positions, thereby maintaining gas within the interior space of said vessel.

6. The power generating system as recited in claim 1, wherein said system stores potential energy by halting said lever and vessel at their lower-most position, closing said at least one upper and lower valves, and halting said at least one pump after substantially all of said liquid has been removed from the interior space of said vessel, thereby maintaining gas within the interior space of said vessel.

7. The power generating system as recited in claim 1, wherein said vessel is pivotally attached to the second end of said lever, and said vessel contains an automatic leveller device.

8. The power generating system as recited in claim 1, wherein the movements of said vessel describe an arc.

9. The power generating system as recited in claim 1, wherein said at least one upper valve comprises a gas/liquid shutoff valve, said at least one lower valve comprises a liquid shutoff valve, and said at least one pump is submersible.

10. The power generating system as recited in claim 1, wherein said vessel is domed and contains a manifold that is hydraulically in communication with said at least one lower valve and said at least one pump.

11. The power generating system as recited in claim 1, wherein said lever is immersed within said source of liquid at all times.

12. The power generating system as recited in claim 1, wherein said vessel, at its uppermost position, floats on the surface of said source of liquid.

13. The power generating system as recited in claim 1, wherein said vessel, at its uppermost position, does not reach the surface of said source of liquid.

14. The power generating system as recited in claim 1, wherein said vessel, during its upward movement, can be stopped indefinitely at any position along its travel.

15. A method for generating power, comprising the steps of:
   (a) providing a first structure having a pivot point, and a movable lever having a first end and a second end, said first end being pivotally attached to said pivot point, said second end being vertically movable with respect to said pivot point;
   (b) providing an applied force vessel operationally attached to the second end of said lever, said vessel comprising a hollow container having at least one through-hole in its upper lid, and at least one through-hole in its lower base, said vessel having at least one upper valve mounted proximal to at least one through-hole in the upper lid of said vessel, at least one lower valve mounted proximal to at least one through-hole in the lower base of said vessel, and at least one pump mounted proximal to another one of said at least one through-hole in the lower base of said vessel;
   (c) providing a pipe having a first end and a second end, said first end being operationally attached to another one of said at least one through-hole in the upper lid of said vessel, the second end of said pipe extending to a source of gas;

(d) providing a linear displacement device having a first end and a second end, said first end being operationally attached to said first structure, said second end being operationally attached to said lever;

(e) providing a source of liquid having a volume greater than the external volume of said vessel;

(f) moving said vessel downward due to the force of gravity when said at least one upper valve and at least one lower valve are opened, thereby allowing liquid from said source of liquid to enter and pass through the interior space of said vessel;

(g) removing substantially the liquid from the interior space of said vessel by operation of said at least one pump, while gas from said source of gas enters the interior space of said vessel via said pipe;

(h) moving said vessel upward due to the buoyant force created by displaced liquid when said at least one upper valve and said at least one lower valve are closed; and (i) extending said linear displacement device when said vessel moves downward and retracting said linear displacement device when said vessel moves upward.

16. The method as recited in claim 15, wherein said linear displacement device comprises a linear-motion hydraulic actuator, and further comprising the step of providing at least one hydraulic accumulator which stores pressurized hydraulic fluid that is received from said linear-motion hydraulic actuator.

17. The method as recited in claim 15, wherein said linear displacement device comprises a double-acting linear-motion hydraulic actuator, and further comprising the steps of providing at least one hydraulic accumulator which stores pressurized hydraulic fluid that is received, during both the extension and retraction strokes, from said linear-motion hydraulic actuator.

18. The method as recited in claim 15, wherein said linear displacement device comprises a linear-motion hydraulic actuator, and further comprising the steps of providing at least one hydraulic motor and electrical generator set, said hydraulic motor receiving pressurized hydraulic fluid from said linear-motion hydraulic actuator, and said hydraulic motor driving said electrical generator.

19. The method as recited in claim 15, further comprising the steps of storing potential energy by halting said lever and vessel at their uppermost position, halting the operation of said at least one pump, and maintaining said at least one upper and lower valves in their closed positions, thereby maintaining gas within the interior space of said vessel.

20. The method as recited in claim 15, further comprising the steps of storing potential energy by halting said lever and vessel at their lower-most position, closing said at least one upper and lower valves, and halting said at least one pump after substantially all of said liquid has been removed from the interior space of said vessel, thereby maintaining gas within the interior space of said vessel.

21. The method as recited in claim 15, further comprising the step of storing potential energy by halting the movement of said lever and vessel at any position along its travel after substantially all of said liquid has been removed from the interior space of said vessel and maintaining said at least one upper and lower valves in their closed positions, thereby maintaining gas within the interior space of said vessel.

22. A power generating system, comprising:

(a) a first structure having a pivot point;

(b) a movable lever having a first end and a second end, said first end being pivotally attached to said pivot point, said second end being vertically movable with respect to said pivot point;

(c) an applied force vessel operationally attached to the second end of said lever, said vessel comprising a hollow container having at least one through-hole in its upper lid, and at least one through-hole in its lower base, said vessel having at least one upper valve mounted proximal to at least one through-hole in the upper lid of said vessel, and at least one lower valve mounted proximal to at least one through-hole in the lower base of said vessel;

(d) a pipe having a first end and a second end, said first end being operationally attached to another one of said at least one through-hole in the upper lid of said vessel, the second end of said pipe extending alternatively to one of a source of gas and a source of pressurized gas;

(e) a linear displacement device having a first end and a second end, said first end being operationally attached to said first structure, said second end being operationally attached to said lever; and (f) a source of liquid having a volume greater than the external volume of said vessel;

wherein, said vessel is configured to move downward due to the force of gravity when said at least one upper valve and at least one lower valve are opened, thereby allowing liquid from said source of liquid to enter and pass through the interior space of said vessel;

said source of pressurized gas operates to substantially remove the liquid from the interior space of said vessel by entering the interior space of said vessel via said pipe and displacing said liquid, and said vessel is further configured to move upward due to the buoyant force created by displaced liquid when said at least one upper valve and said at least one lower valve are closed; and said linear displacement device is configured to extend when said vessel moves downward and is forced to retract when said vessel moves upward.

* * * * *